Feb. 4, 1964

R. MATTHEWS 3,120,660

TRACKING RADAR

Filed Aug. 19, 1957

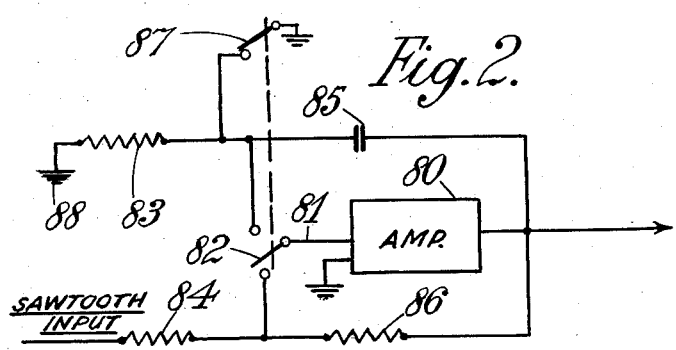
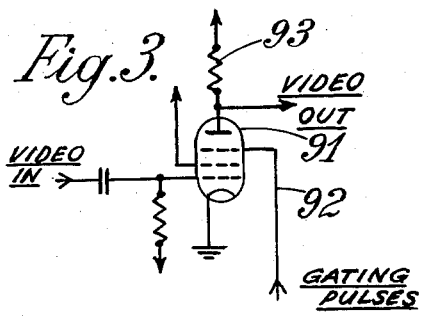
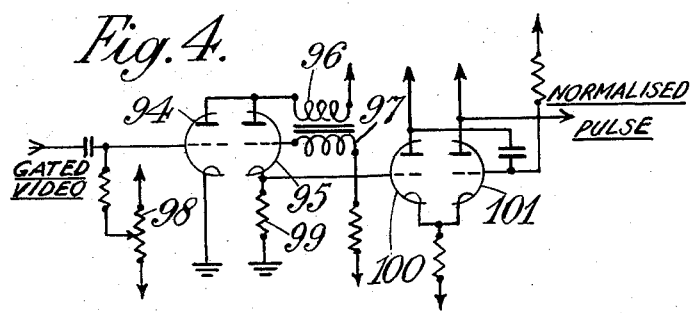

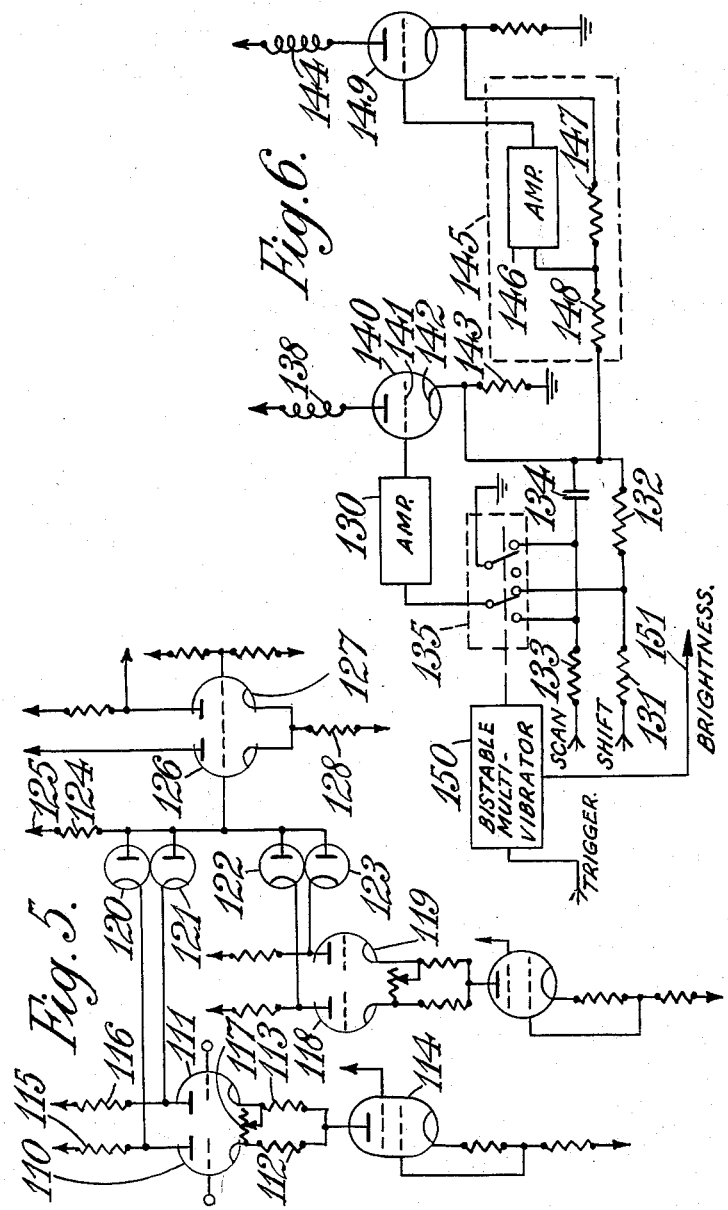

Feb. 4, 1964  R. MATTHEWS  3,120,660
TRACKING RADAR
Filed Aug. 19, 1957  6 Sheets-Sheet 4

Fig. 1.

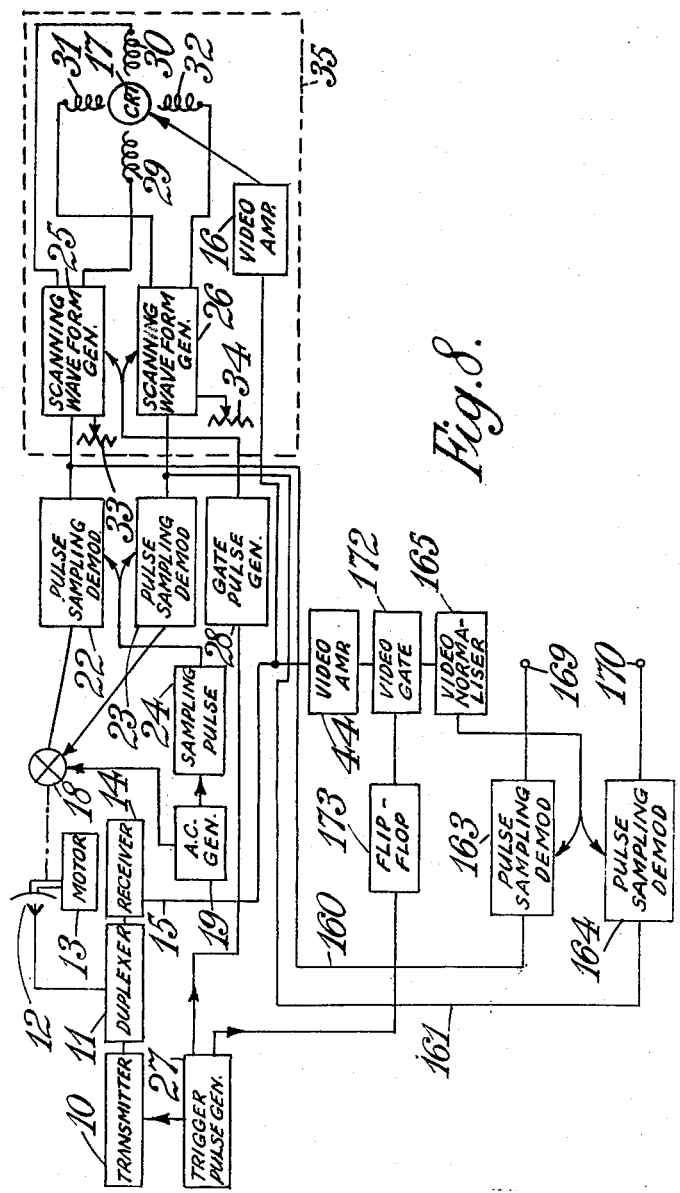

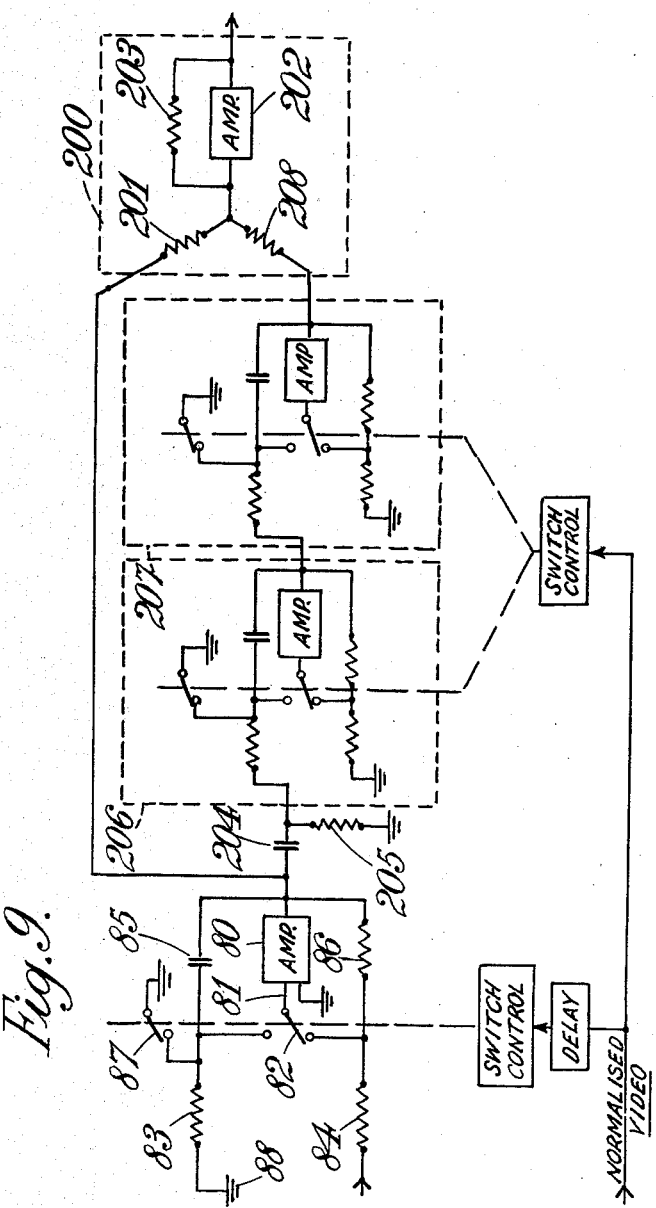

United States Patent Office 3,120,660
Patented Feb. 4, 1964

3,120,660
TRACKING RADAR
Robert Matthews, London, England, assignor to Decca
Limited, a British company
Filed Aug. 19, 1957, Ser. No. 678,890
20 Claims. (Cl. 343—11)

This invention relates to apparatus for producing an electrical output representative of the time phase of an electrical signal selected out of a repetitive gradually varying sequence of different signals.

The invention is particularly applicable to radar apparatus. Radar information is commonly displayed on cathode ray tubes in a manner such that the position on the screen of the tube of a signal derived from a received echo from a radar target gives information about the target. Frequently it is desirable to utilise such information about a selected target; for example it may be required that the information is identifiably displayed on another display or it may be desired to use the information for control purposes. It is one of the objects of the present invention to provide improved means whereby electrical signals may be obtained which are representative of the position of a selected target on a radar screen and which vary automatically in accordance with the changes in position of the target. The invention however, is not limited to use with radar displays but may be applied to any form of repetitively scanned cathode ray tube display employing fixed deflector means in which the desired information is represented by the position on the screen of the tube of a particular response due to a video modulation signal or, more generally, to any system in which equivalent scanning and video signals are available. It is not necessary for the present invention that the information should actually be displayed on a cathode ray tube in order that desired information should be selected and used elsewhere provided, however, the appropriate signals are available such as would enable it to be displayed.

According to this invention, apparatus for producing an electrical output representative of the time phase of an electrical signal selected from a repetitive gradually-varying sequence of different signals comprises means for producing a voltage varying in time in synchronism with the repetitive sequence and pulse sampling storage means controlled by a sampling pulse derived from the selected signal, arranged to sample said varying voltage at the instant of the selected signal and to provide an output signal representative of the sampled value. By this arrangement the selected signal controls the sampling and so ensures that the sampled voltages are representative of the required values.

According to one arrangement of the invention, in a system employing electrical signals comprising scanning control and video pulse signals such as can be employed for representing information on a cathode ray tube by deflecting the cathode ray beam in two co-ordinate directions by means of fixed deflector means whereby the desired information may be represented by the position on the screen of the tube of a response caused by modulation of the beam with a video signal, there are provided pulse sampling storage means controlled by a sampling pulse derived from a video pulse signal corresponding to a particular item of information and arranged to sample the values of the scanning control signals or signals derived therefrom or corresponding thereto at the instant of occurrence of that video pulse signal and to provide output signals representative of these sampled values for a duration longer than the duration of the sampling pulse. It will be seen that the sampled voltages are representative of the coordinate deflections of the cathode ray beam corresponding to the selected video pulse signal. It will be understood that the co-ordinate directions need not be the same as the directions of deflection of the deflector means; for example, in a radar plan position indicator, two deflector means may be arranged for deflecting the beam in two directions at right angles and appropriate deflection signals applied simultaneously to the deflector means so that the scanning is effected in a radial line which is rotated in synchronism with the rotation of the radar aerial.

According to another aspect of the invention, in a display system having a repetitively scanned cathode ray display tube employing a pair of fixed deflector means for deflecting the cathode ray beam respectively in two co-ordinate directions by the application of scanning signals whereby desired information may be represented by the position on the screen of the tube of a particular response caused by modulation of the beam with a video signal, there are provided pulse sampling storage means controlled by a sampling pulse derived from the video signal corresponding to the particular response and arranged to sample the instantaneous values of voltages representative of or corresponding to the instantaneous deflection of the cathode ray beam in the two co-ordinate directions at the instant of occurrence of the particular response and to provide output signals representative of the sampled values of the voltages for a duration longer than the duration of the sampling pulse.

As previously indicated, the invention is particularly applicable to radar apparatus, and according to a further aspect of the present invention, a radar apparatus comprises a pulse transmitter arranged to produce repetitive radio frequency pulses, a directional aerial system coupled to said transmitter for radiating pulses and for receiving echoes thereof, a receiver coupled to said aerial system to be fed with the received echoes to produce a video signal output, means for angularly moving the directional receiving beam of the aerial system in a repetitive manner, scanning signal generator means synchronised with the transmitter and with the receiving beam angular movement for producing two scanning sawtooth voltages synchronised to start with the transmitted pulses and having slopes proportional respectively to the sine and cosine of the angular position of the receiving beam, and pulse sampling storage means controlled by a sampling pulse derived from a received video signal corresponding to a selected response and arranged to sample the values of the scanning sawtooth voltages produced by said scanning signal generator means at the instant of occurrence of the selected response and to provide output signals representative of those sampled values. Such an arrangement provides output signals representative of the instantaneous position of a response on the screen of the tube. Such information may be used for various purposes, for example information about the position of an aircraft might be used directly for controlling that aircraft, or the information might be fed to a computer or it might be applied to a display which is required to display only selected signals.

The aforementioned scanning signal generator means may comprise for example a magslip rotated with the receiving beam and fed with alternating current, two pulse sampling demodulators for sampling the two outputs of the magslip to product direct voltages proportional to the sine and cosine of the instantaneous magslip setting and two integrators for producing sawtooth voltages varying at rates dependent on the respective outputs of the two demodulators.

In some cases, particularly with radar apparatus, it is only necessary to know the bearing of a response and not the range. For example, this information might be required to cause the aerial of a height finding radar system adjacent the main radar apparatus to follow a selected response; it is then necessary to cause the height finding aerial to be rotated to the appropriate direction and bearing information for this purpose could be arranged to control the bearing of the height finding aerial automatically so as to follow the movements of the selected target. Tracking in bearing angle might also be required for example, in dealing with jamming or for measuring departure from an approach path. Tracking in a bearing angle will generally permit of some simplification of the apparatus compared with tracking the position of a response, particularly in that the duration of the sampling pulse can then be made much less critical as will be more clearly apparent later. One arrangement of radar apparatus for tracking in bearing comprises a pulse transmitter arranged to produce repetitive radio frequency pulses, a directional aerial system coupled to said transmitter for radiating pulses and for receiving echoes thereof, a receiver coupled to said aerial system to be fed with the received echoes to produce a video signal output, means for angularly moving the directional receiving beam of the aerial system in a repetitive manner, signal generator means synchronised with the receiving beam angular movement for producing two voltages having amplitudes proportional respectively to the sine and cosine of the angular position of the receiving beam, and pulse sampling storage means controlled by a sampling pulse derived from a received video signal corresponding to a selected response and arranged to sample the values of the voltages produced by said signal generator means at the instant of occurrence of the selected response and to provide output signals representative of those sampled values. For tracking in bearing, as for tracking in position, the pulse sampling storage means would generally be arranged to hold the sampled voltage values for the duration of a cycle of the repetitive angular movement of the receiving beam. In some cases, however, it may be desired to obtain information and, for example, to provide indications of the bearings of all targets seen by a radar system and in this case, the pulse sampling storage means may be controlled by sampling pulses derived from all the various different responses in each cycle of the repetitive angular movement of the receiving beam and arranged to hold each sampled voltage value only until the next sampling pulse is produced. Such an arrangement, for example, could be used for control of marker traces on a cathode ray tube display, each trace being produced repetitively on the bearing of a radar response until the radar receives the next response, whereupon the bearing display trace will hop to the bearing of this next response. If the bearing display tube has an afterglow screen, this system will thus provide a sample means of indicating which responses are moving in bearing.

In all the radar systems described above, the aerial system may have a continuously rotatable directional receiving aerial. In accordance with common practice, such a receiving aerial may also be used for transmission. The present invention may, however, be used with static aerials in which the receiving beam is scanned over a sector by a beam scanning arrangement, provided suitable signals representative of the receiving beam scanning movement are available for sampling.

If the apparatus is arranged to produce signals which are stored for a complete cycle of the aerial receiving beam movement, the aforementioned pulse sampling storage means may comprise a gating circuit for gating the video signals in accordance with a gate control pulse, a pulse sampling demodulator controlled by the gated video output of the gating circuit to sample the signal required to be sampled at the instant of occurrence of an output pulse from the gating circuit and a comparator to compare the input to the pulse sampling demodulator with the previously sampled output and to produce a short duration pulse, constituting said gate control pulse, when the input is, within predetermined limits, equal to the previously sampled output. In an arrangement in which the pulse sampling storage means samples two voltages, separate pulse sampling demodulators are provided for sampling the two voltages, both demodulators being controlled by a common gate control pulse derived from said gating circuit and the comparator is arranged to compare each of the inputs to the two pulse sampling demodulators with the corresponding previously sampled outputs and to produce a short duration pulse, constituting said gate control pulse, when both inputs are, within predetermined limits, equal to the previously sampled outputs. It will be seen that by the use of this double comparator the gating circuit is only opened to pass video signals when both the sampled voltages are the correct value. If these voltages are representative of the sine and cosine of the angular position of the receiving beam, as described above, it will be seen that the double comparator gate avoids any quadrantal ambiguity in the sampling, in that the gate will only be opened when the scanning voltages represent the correct bearing in the appropriate quadrant.

Preferably, means are provided for normalising the video output passed by said gating circuit so that the control signal fed to the pulse sampling demodulator (or demodulators) is a pulse signal of predetermined duration and amplitude. These normalised video signals most conveniently have a rectangular waveform. It will be appreciated that in any pulse sampling storage device the sampling pulse must have a duration very brief compared with the time taken for the quantity being sampled to move between its limits.

The aforementioned demodulator or each demodulator may comprise an amplifier with switchable feedback and input circuits arranged for the duration of the sampling pulses to act as a fast integrator rapidly charging a capacitor in a feedback circuit to a voltage corresponding to the sampled voltage and arranged, during the intervals between the sampling pulses, to vary the charge on the capacitor at a slow rate dependent on an input control voltage.

The aforementioned input control voltage would, in general, be a constant voltage such as to keep the charge on the capacitor constant. In this case the output voltage would change in a step at each sampling pulse. However, it may be preferred to provide means responsive to the differences between successive sampled values and arranged to produce a smoothing voltage dependent on these differences to cause the charge on the capacitor to vary slowly at a rate which is combined with the stepped voltage to minimise sudden changes in the voltage output at each sampling pulse. It will be seen that with this last described modification, the position of the gate would move gradually at a rate dependent on the past rate of movement of the response. Such smoothing of the output data (which controls the position of the video gate) permits a smaller gate to be used than would otherwise be necessary whilst still ensuring the required response is followed. The size of the gate may then be made a function only of the possible divergence from the linearly predicted position in the interval between consecutive samplings of the response position. If another target should appear in this gate, due to two targets yielding echoes close together, then the response from the unwanted target may slightly alter the next predicted position. This alteration of predicted position, however, will only be small since the additional information from the second target in one single scan will not substantially alter the measured velocity determined by the differentiating circuit provided that circuit has a sufficiently long time constant. It will be seen therefore that the gate will continue to track substantially in the direction of movement of the selected target and this arrangement therefore provides a substantial measure of protection against starting to track an unwanted response if two targets should come close together. If for any reason loss of tracking occurs because the required target echo falls outside the gate, means may be provided for increasing the size of the gate as a function of the difference between predicted and actual positions so that the gate expands at each aerial scan by an amount at least equal to the maximum divergence. This should have the effect of ensuring optimum lock-on whenever tracking fails.

If the sampled output voltages are to be displayed as positional indications on the screen of a cathode ray tube, they may be applied either directly as voltages to deflector plates of an electro-statically deflected tube or arranged to control deflection currents in deflection coils of an electro-magnetically deflected cathode ray tube to effect deflection of the beam by the appropriate amounts in two co-ordinate directions. These voltages may however be arranged to control further scanning signal generators for producing scanning waveforms to produce traces starting from a position representing the sampled position. Such waveforms might produce traces representing further information e.g. course and speed of a target or might be arbitrary rasters e.g. letters or figures, for identification purposes. If the cathode ray tube has two sets of fixed deflection coils arranged respectively for deflecting the cathode ray beam in co-ordinate directions at right angles, the deflection currents may be controlled by four scanning waveform generators in the manner described in British patent specification No. 679,722 or by two scanning waveform generators in the manner described in the specification of application No. 661,699 filed May 27, 1957, now Patent No. 2,994,868, granted August 1, 1961. If the sampled voltages are arranged to produce a simple spot deflection on the cathode ray display tube, in order to identify and to make more clearly visible the spot thus produced, phase quadrature alternating modulations of small amplitude may also be applied to the two deflector means so that the cathode ray beam, instead of indicating a fixed spot, traces a small circle on the screen of the tube around the required co-ordinate position. Conveniently the amplitude of these modulation signals is controlled in accordance with the width of the let-through gate so that it will indicate to the observer the let-through area. The cathode ray beam of this deflecting tube may however be made to execute other arbitrary rasters if required which rasters may be derived from suitable waveform generators and may be modulated by a flying spot scanner or a monoscope so as to write for example letters or numbers. By such an arrangement any one selected target from a radar display may be shown on a cathode ray tube together with possibly identification marks. By providing further sets of the necessary parts of the equipment, further selected responses may also be displayed, the various signals being applied in sequence to the cathode ray tube.

The following is a description of a number of embodiments of the invention, reference being made to the accompanying drawings in which:

FIGURE 1 is a block diagram of a pulse radar apparatus with an echo-follow system for displaying the position of a selected target on a cathode ray tube;

FIGURES 2, 3, 4, 5 and 6 are diagrams illustrating in further detail parts of the apparatus of FIGURE 1;

FIGURE 7 is a block diagram illustrating a pulse radar apparatus with a bearing follow system for producing outputs representative of the bearing of a selected target;

FIGURE 8 is a modification of the arrangement of FIGURE 7; and

FIGURE 9 is a diagram illustrating a modification of the arrangement of FIGURE 2.

Figure 1:
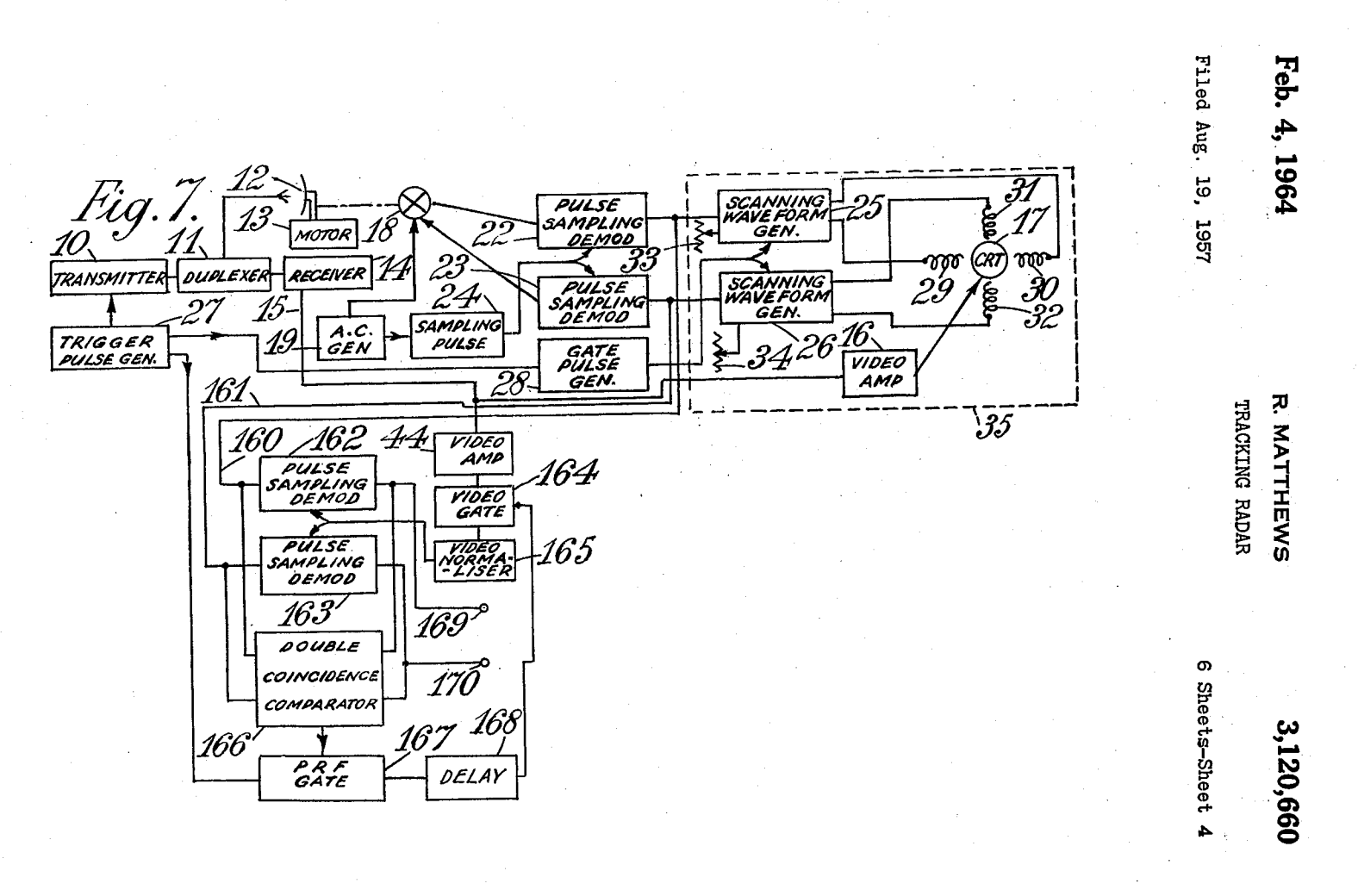

Referring to FIGURE 1 there is illustrated diagrammatically pulse radar apparatus comprising a pulse transmitter 10 arranged to produce radio frequency pulses of a microwave frequency which are fed through a duplexer 11 to a directional aerial 12. This aerial is continuously rotated by means indicated diagrammatically as a motor 13 so that the directional beam is scanned in azimuth. Signals received by reflection of the radiated pulses at distant targets, after being picked up by the aerial 12, are fed through the duplexer 11 to a receiver 14 which provides a video frequency output indicated as being on a lead 15. The video signals are fed through a video frequency amplifier 16 to modulate the beam of a cathode ray tube 17. This cathode ray tube is arranged to provide a plan position display by scanning the cathode ray beam to produce a radial trace which is rotated in synchronism with the rotation of the aerial 12. For this purpose the aerial 12 is coupled, either directly or through a servo system, to a magslip 18 having a rotor coil energised with alternating current from an alternating current generator 19, so that its two stator coils provide outputs having instantaneous outputs proportional to the sine and cosine of the angular position of the aerial. The two outputs of the magslip are fed respectively to pulse sampling demodulators 22, 23. These outputs from the magslip are alternating currents and the pulse sampling demodulators sample these alternating currents, preferably at the peak of each cycle, the sampling pulses for this purpose being derived from a sampling pulse generator 24 producing the required pulses from the output of the generator 19. The pulse sampling demodulators 22, 23, which will be described in further detail later with reference to FIGURE 2, produce direct voltage outputs proportional respectively to the sine and cosine of the angular position of the aerial. These sine and cosine voltage outputs are applied respectively to two scanning waveform generators 25, 26 for producing sawtooth time-base waveforms having slopes proportional to the sine and cosine voltages and starting at times synchronised with the pulses from the transmitter 10, this synchronisation being effected by means of a trigger generator 27 which provides trigger pulses both for the transmitter 10 and for a gating circuit 28 for the scanning waveform generators 25, 26. The construction of these scanning waveform generators is described more fully later with reference to FIGURE 6 and for the present it may be said that the waveform generator 25 provides two outputs of opposite phase which are fed to a first pair of deflector coils 29, 30 for the cathode ray tube 17 to effect deflection of the cathode ray beam in one direction and the waveform generator 26 provides two outputs of opposite phase which are fed to a second pair of deflector coils 31, 32 for effecting deflection of the cathode ray beam in a direction at right angles to that effected by coils 29, 30. As will be explained more fully with reference to FIGURE 6, the plan position display on the tube 17 may be off-centered by adjusting offcentering control voltages fed to the waveform generators 25, 26 from control voltage sources indicated diagrammatically in FIGURE 1 by potentiometers 33, 34.

The present invention is concerned more particularly with providing an automatic following system for producing voltages representative of the position of a selected target. Such a target would appear, in the arrangement of FIGURE 1, as a response on the cathode ray tube 17 but, for this purpose, there is no necessity to have such a display tube 17 and this display tube with its associated equipment within the dashed lines 35 may be omitted if a complete radar display is not required. For the automatic follow system, the outputs from the two pulse sampling demodulators 22, 23 are fed respectively to a further pair of scanning waveform generators 40, 41 which produce sawtooth voltage waveform outputs having slopes proportional respectively to the sine and cosine of the angular position of the aerial and triggered by the trigger pulse generator 27 to start at the instant of transmission of the pulses from the transmitter 10. As will be apparent later, it is the voltage waveforms from the waveform generators 40, 41 which are sampled to provide the required echo-follow output signals. The reason for using separate waveform generators 40, 41 instead of making use of the waveform generators 25, 26 is that the latter have to feed deflection coils which necessarily have some resistance and may be provided with damping resistors. The load on the waveform generators 25, 26 is thus not a simple inductive load and the waveform generators 25, 26 have to produce outputs which will, when fed to their complex loads, produce the required (generally linear) relationship between deflection and time. Furthermore, the use of separate waveform generators facilitates the off-centering of the display on the tube 17 without affecting the sawtooth waveforms to be sampled to provide the required echo-follow output signals.

The waveform generators 25, 26 and their associated circuits controlling the cathode ray tube 17 form no part of the echo-follow system and may be omitted if it is not required to have any display, such as the display 17, of the radar signals.

The waveform generators 40, 41 are arranged to produce waveforms corresponding to the scanning waveforms of a plan position cathode ray tube display which is centered at the co-ordinate origin. The sawtooth voltage outputs from the two waveform generators 40, 41 are fed respectively to two further pulse sampling demodulators 42, 43 which are arranged, as will hereinafter be described, to sample these sawtooth waveforms at the instant of occurrence of a selected radar response. The pulse sampling demodulators 42, 43 are similar to the demodulators 22, 23 and will be described in more detail with reference to FIGURE 2. To provide the sampling pulses for the demodulators 42, 43 the video output from the receiver 14 is fed, after amplification by a video amplifier 44, to a gating circuit 45 which, as hereinafter described, passes the video signals only for a limited duration when the required response signals are received which duration is short compared with the pulse repetition period of the radar system. Since response signals for a given target may be received from several successive transmitted pulses, the gate may be opened for short durations during a few successive line scans and then closed for the remainder of the aerial scanning cycle. The video signals passing through the gate 45 are fed into a video normalising circuit 46 which converts each video pulse passing through the gate into an output pulse of a predetermined amplitude and duration. The video gate 45 and the normalising circuit 46 are illustrated in more detail in FIGURES 3 and 4 and will be further described later. The output from the video normalising circuit 46 is fed into the two pulse sampling demodulators 42, 43 to provide the sampling pulses for these demodulators so that the outputs from the scanning generators 40, 41 are sampled at the instant of occurrence of these sampling pulses. The pulse sampling demodulators 42, 43 produce direct voltage outputs at terminals 47, 48 corresponding to the sampled scannnig waveforms from the waveform generators 40, 42 at the instant of sampling and these output voltages are stored over a complete cycle of revolution of the aerial. When the required response is received, the video output will pass through the gate 45 and will operate the pulse sampling demodulators which will then correct the previously stored sampled information to the latest value. The stored voltage values are compared with the output voltages from the corresponding scanning waveform generators 40, 41 in a double coincidence comparator 49 to be described in further detail later, which comparator produces an output pulse only when each of the scanning waveforms from the waveform generators 40, 41 is approximately equal to the corresponding stored voltage within predetermined limits; this output pulse is used to control the opening of the video gate 45. It will be seen that the video gate 45 passes a response from the selected target and this response will operate the pulse sampling demodulators at the appropriate times in the pulse repetition periods when the aerial is in the appropriate direction to sample the scanning waveforms from the scanning waveform generators 40, 41. The double coincidence comparator 49 will ensure that the gate 45 is not open again until the scanning waveforms are appropriate to admit the selected response and thus the pulse sampling demodulators 42, 43 will not sample the scanning waveforms from the waveform generators 40, 41 in response to any other received echoes.

It will be appreciated that it is necessary to start the system in operation by selecting signals from a particular response and this is done by opening the video gate 45 at the right instant. One way of doing this is to put appropriate sine and cosine voltages into the two inputs of the double coincidence comparator 49 which are normally connected to the outputs of the demodulators 42, 43. These control voltages may be derived, for example, from joystick-controlled sine and cosine potentiometer, and this potentiometer, or another one ganged thereto, may be arranged to control the position of an electronic marker on a cathode ray tube display, e.g. the display 17, so that the potentiometer output voltages can readily be adjusted to correspond to any selected response.

As has been described above, the outputs of the pulse sampling demodulators 42, 43 are direct voltages representative of the position of a selected response. There are many possible uses of such voltages; they may, for example, be fed to a computer for computing navigational data, e.g. for interception purposes, or they may be used for controlling a craft along a pre-determined track or they may be fed to a display which displays only selected targets. In FIGURE 1 there is illustrated diagrammatically one form of display for showing only selected targets. This display comprises a cathode ray tube 50 with fixed deflection coils 51, 52, 53, 54 fed from scanning waveform generators 55, 56 in a manner similar to the display tube 17. These scanning waveform generators are described in further detail later with reference to FIGURE 6 and for the present it may be explained that each scanning generator has two input circuits to which direct control voltages are applied, one of which controls the slope of a sawtooth output waveform and the other of which controls the starting level of this sawtooth. The echo-follow system described above providing outputs at terminals 47, 48 may be only one of a number of echo-follow systems or other control signal sources for producing displays on the cathode ray tube 50. The waveform starting level input circuits for the two scanning waveform generators 55, 56 are therefore shown as being switchably connected by means of switch arms 57, 58 respectively to a number of input circuits such as 59, 60, 61 and 62. The circuits 60 and 62 are shown as connected to the terminals 47, 48 for feeding the outputs of the pulse sampling demodulators 42, 43. The switches 57, 58 may in practise be high speed electronic switches operated by a switch selector control unit 63 which controls the switches to connect the various input circuits in sequence to the waveform generators 55, 56. If the selected responses are to be displayed on the cathode ray tube 50 as a spot, then when the switches 57, 58 are connected to the pulse sampling demodulators 42, 43 the scanning rate input circuits of the waveform generators 55, 56 may be connected to a source of zero potential so that the scanning output waveform is merely a constant current. Preferably, however, the spot is controlled by interrupting the scanning control input of the waveform generators 55, 56 so that the output is controlled only by the shift control circuits. The scanning rate control inputs of the waveform generators 55, 56 are connected to switch arms 64, 65 of a second pair of switches similar to switches 57, 58 and operated in synchronism therewith by the selector control unit 63 and it will be seen in FIGURE 1 that, when the switches 57, 58 are connected to the pulse sampling demodulators 42, 43, the inputs to the waveform generators 55, 56 for scanning rate control are earthed by circuits 66, 67. The outputs of the two scanning waveform generators 55, 56 may be modulated in phase quadrature by a small amplitude alternating current so that the spot becomes a small circle. Preferably as shown at 68, the modulating voltage is applied to the shift control input circuits of the scanning waveform generators 55, 56. The amplitude of this alternating current may be controlled by the double coincidence comparator 49 through a modulation amplitude control unit 69 in synchronism with the control of the width of the gate 45 for passing the video signals to the pulse sampling demodulator 42, 43 so that a visual indication of the width of the gate is provided. Such phase quadrature modulation may be at any convenient frequency. It may be preferable in some cases however, instead of having the responses indicated as spots or small circles, to have the cathode ray beam execute pre-determined rasters modulated for example by a monoscope so that each response is identified as for example a letter or figure, and for this purpose the scanning rate control inputs of the scanning waveform generators 55, 56 can by means of the aforementioned switches 64, 65 be connected to the appropriate scanning control signal sources. The display tube 50 might be a display tube for another radar system completely independent of that shown in FIGURE 1 (transmitter 10, aerial 12, receiver 14 etc.) and, in this case, provision may be made for feeding suitable scanning control signals to the waveform generators 55, 56 in one position of the switches 57, 58, 64 and 65. Thus off-centering control voltages, indicated diagrammatically as being produced by adjustable potentiometers 70, 71 are applied to input circuits 59, 61 and scanning rate control voltages (e.g. from pulse sampling demodulators similar to the demodulators 22, 23) are applied to rate control input circuits 72, 73. If such a radar display is provided on tube 50, radar video signals from this independent radar must be fed into the display tube to modulate the brightness of the cathode ray beam and, for this purpose, there is shown a further switch 74 controlled by the selector control unit 63 in synchronism with the switches 57, 58, 64 and 65 and which, in the appropriate position feeds the video signals to the tube 50. If, in all the other switch positions, arbitrary rasters or indicating marks are displayed, then in these switch positions suitable brightening pulses may be fed to the tube from a gate pulse generator 75 controlled by a trigger unit 76 which would, in this case, conveniently be a master trigger unit controlling the timing of pulse transmission of the independent radar. The gate pulse generator 75 may conveniently also produce the timing pulses for controlling the waveform generators 55, 56.

It will be appreciated that the circuits associated with the cathode ray tube 50 will be considerably simplified if it is not required to display any radar signals on that tube.

If a number of echo-follow circuits are to be used for one radar, it will be seen that the scanning waveform generators 40, 41 may be common for all these circuits and that it would only be necessary to provide separate pulse sampling demodulators 42, 43, video gates 45, video normalisers 46 and double coincidence comparators 49.

FIGURE 2 illustrates diagrammatically a form of pulse sampling demodulator for use in the arrangement of FIGURE 1. As shown in FIGURE 2, there is provided an amplifier 80 having a high gain and having an input 81 switchable by means of a switch 82 to one or other of two alternative input resistors 83, 84. Two alternative feedback circuits are also provided, one comprising a capacitor 85 connected between the amplifier output and that end of the input resistor 83 which is connected to the switch contact and the other feed-back circuit consisting of a resistor 86 connected between the amplifier output and that end of the resistor 84 which is connected to the switch contact. The switch 82, which may conveniently be an electronic switch, is operated in synchronism with a second switch contact 87 arranged so that when the junction of resistors 84, 86 is connected to the amplifier input, then the junction of resistor 83 and capacitor 85 is earthed by means of the switch contact 87. In the simplest form the end of the resistor 83 remote from the amplifier is connected to earth as indicated at 88. The end of the resistor 84 remote from the amplifier input is connected to a source of the waveform to be samples, and the switch contact 82 is switched so that the resistor 84 is connected to the amplifier input for the duration of the sampling pulse. It will be seen that when the switch contact is in this position, the capacitor 85 will very rapidly charge to a voltage representation of the sampled input voltage and dependent only on that voltage and the ratio of the magnitudes of resistors 84, 86. At the end of the sampling pulse, the switch contact 82 is moved over to its other position and the circuit will then act as a Miller sawtooth waveform generator generating a waveform having a slope dependent on the input voltage applied to resistor 83. If the latter is earthed, a indicated at 88, then the waveform would have a zero slope, that is to say the charge on the capacitor 85 will be maintained at a constant level. Such an arrangement as described with reference to FIGURE 2 may be used for the demodulators 22, 23, 42 and 43 of FIGURE 1.

For the pulse sampling demodulators 42, 43, it is preferred to use a modified arrangement in which the output is not constant between each sampling pulse but is made to change at a rate dependent on the rate of change between previous sampling pulses so as to give a smoothed output. One such arrangement for this purpose is illustrated in FIGURE 9 in which it will be seen that references 80–88 are used to illustrate similar components to those of FIGURE 2. The output from amplifier 80, which consists of a voltage remaining constant between sampling pulses and then jumping to the newly sampled value, is fed to an adding circuit 200. In this circuit the output from amplifier 80 is fed through a resistor 201 to a high gain amplifier 202 having a resistive feedback circuit 203. This adding circuit combines the output from amplifier 80 with a sawtooth correction voltage which is obtained in the following way. Part of the output from amplifier 80 is differentiated by a circuit comprising capacitor 204 and resistor 205 to get pulse signals of amplitude proportional to the difference between consecutive sampled levels. These pulse signals are integrated by an integrator 206 which it will be seen is generally similar to the circuit of FIGURE 2, the pulses however, being applied to the scanning input circuit. The square wave output of integrator 206 is then fed to a second integrator 207 to produce a sawtooth output which is fed through a resistor 208 to the amplifier 202 in the adding circuit 200. Both the integrators 206 and 207 are "reset" to earth by a switch control pulse just before the sampling. For this purpose conveniently the normalised video (from the normalising circuit 46) may be fed directly to control the switching of integrators 206, 207 and fed through a delay giving a small delay sufficient to ensure that the integrators 206, 207 are reset to earth just before the operation of the switch 82. The circuit is arranged so that the correcting sawtooth is of an amplitude such as to smooth out the steps in the output from amplifier 80. If this correcting circuit is used in the demodulators 42, 43 of FIGURE 1, it will be seen that the position of the gate controlled by the gating circuit 45 will move gradually at a rate dependent on the past rate of movement of the selected response over a number of aerial scans. With this arrangement the size of the gate may then be made a function only of the possible divergence from the linearly predicted position in the interval between consecutive samplings of the response position and hence the gate may have a smaller width than would be the case if the input to the resistor 208 in the demodulator was earthed. This arrangement has a further advantage that, if a second target should appear in the gate, then, although the response of this second target may slightly alter the next predicted position, this alteration of predicted position will only be small since the differentiating circuit is measuring the velocity over several cycles of an aerial scan and hence the gate will continue to move substantially in the direction of movement of the required response. This continuing movement of the gate, together with the inherently small width of the gate made possible by the use of the above-described circuit, thus provides a substantial measure of protection against the circuit starting to track an unwanted echo even if two echoes should appear within the gate.

One circuit arrangement for the video gate 45 of FIGURE 1 is illustrated in further detail in FIGURE 3. In FIGURE 3, as in FIGURES 4 and 5 also, connections to sources of operating potentials for valve electrodes are indicated merely by arrows. The video gate of FIGURE 3 comprises a pentode valve 91 to the suppressor grid of which are applied the gating pulses from the double coincidence comparator 49. The video input signals are applied to the control grid of the valve 91 from an input lead 92. The required output from the valve 91 is developed across an anode load resistor 93 and is taken from the anode. It will be seen that this gating circuit is an amplifier valve with switching effected by the suppressor grid.

A circuit arrangement for the video normaliser 46 of FIGURE 1 is illustrated in FIGURE 4. The gated video pulses from the video gate 45 are fed to one control grid of a double triode 94, 95 arranged as a blocking oscillator having two coupled coils 96, 97; the coil 96 is connected between the commoned anodes of the double triode and a high tension supply source and the coil 97 is connected in the grid circuit of the triode portion 95. The control grid of the input triode 94 is connected to the tip of an adjustable potentiometer 98 across a suitable direct potential supply source indicated by arrows. Adjustment of this potentiometer 98 adjusts the amplitude at which the blocking oscillator will operate. The output of the blocking oscillator is taken from a cathode load resistor 99 in the cathode circuit of the second triode portion 95 and is fed to a flip-flop circuit comprising the two portions 100, 101 of a further double triode, which flip-flop is arranged as a monostable circuit producing an output pulse of fixed duration when triggered by a short duration input pulse. The blocking oscillator provides the necessary short duration pulse which is applied to the control grid of the triode valve 100 so triggering the flip-flop. The output is thus a pulse of pre-determined duration and amplitude and is conveniently taken from the anode circuit of the triode portion 101.

The double coincidence comparator 49 of FIGURE 1 is illustrated in further detail in FIGURE 5. The output from the scanning waveform generator 40 (FIGURE 1) is applied to the control grid of a first triode 110 of a double triode 110, 111 and the output from the pulse sampling demodulator 42 is applied to the control grid of the second triode 111. These two triodes have their cathodes connected via separate resistors 112, 113 to a common cathode load of high impedance which cathode load is shown as including a valve 114. The two triodes 110, 111 thus form a long tailed pair and one or other will be cut off when the voltage at its control grid is below the grid voltage of the other valve, but there is a small range of voltage differences in which neither valve is cut off; this circuit thus forms a comparator to give outputs across anode load resistors 115, 116 when the voltages applied to the control grids of valves 110, 111 are equal within a pre-determined range. This range may be varied by altering the rate of switchover and conveniently this may be done by connecting an adjustable resistance 117 between the cathodes of the two valves 110, 111. As will be apparent later, this switchover range determines the width of the gate 45 so far as the co-ordinate direction represented by the scanning waveform generator 40 is concerned. In the arrangement illustrated this range is manually adjustable but, if desired provision may be made for increasing the gate width automatically in steps, one step for each cycle of aerial revolution, if no response passes through the gate by making the resistor 117 a stepped resistor switched by a relay circuit responsive to the absence of output from the video normaliser 46. The gate would then be opened if no response was received and the gate would be arranged to expand at each aerial scan by an amount at least equal to the maximum possible divergence between predicted and actual positions of the response. Provision would be made for returning the gate to the narrowest width as soon as the required response was again being tracked. Reverting to the circuit of FIGURE 5, a second pair of triodes 118, 119 are arranged in a circuit similar to that of the triodes 110, 111 in order to compare the output from the scanning waveform generator 41 with the output from the pulse sampling demodulator 43. The anodes of the four triodes 110, 111, 118, 119 are connected respectively to the cathodes of four diodes 120, 121, 122, 123, the anodes of which are connected in common through a resistor 124 to a suitable source of positive supply potential indicated by arrow 125. The anodes of the four diodes are also connected to the control grid of a further triode valve 126 forming part of another long tailed pair comprising two triode valves 126, 127 having a common cathode resistance 128 of high value. When any one of the triodes 110, 111, 118 and 119 is heavily conductive, its anode voltage will fall, and it will cause the appropriate one of the diodes 120 to 123 to conduct; the resultant potential drop across resistor 124 will reduce the potential at the grid of valve 126 and so cut-off that valve. The valve 126 will thus be cut off unless both the pairs of triodes 110, 111 and 118, 119 are comparing voltages with the small range of differences mentioned above. The normal state of the long tailed pair formed by triodes 126, 127 is therefore for triode 126 to be cut off and hence for triode 127 to be heavily conductive. If both the sampled voltages are within the required limited ranges, the triode 126 will become conductive and triode 127 is cut off. The required output is obtained from the anode circuit of the triode 127 and this output is used, as previously described, for controlling the video gate 45.

FIGURE 6 illustrates a form of waveform generator for use as the scanning waveform generators 25, 26 or 40, 41, or 55, 56 of FIGURE 1. For feeding two deflection coils such as the coils 29, 30, there might be provided two sawtooth generating circuits but in the arrangement shown in FIGURE 6 there is employed one sawtooth generating circuit and a paraphase amplifier. Referring to FIGURE 6, there is provided a high gain amplifier 130 having two alternative feedback and input circuits. The first feedback and input circuit comprise a resistor 131 in series with a resistor 132 and the second feedback and input circuit comprises a resistor 133 in series with a capacitor 134. The input terminal of the amplifier 130 may be connected by means of an electronic switch 135 either to the junction of the resistors 131, 132 or to the junction of the resistor 133 and capacitor 134, this switching being indicated diagrammatically as being effected by a movable switch contact 136. The output of the amplifier 130 may, for the present, be assumed to be connected to that plate of the capacitor 134 which is remote from resistor 133 and also to the end of the resistor 132 remote from the resistor 131. The electronic switch 135 also serves to connect, as is indicated diagrammatically by a switch contact 137, the junction of the resistor 133 and capacitor 134 to earth when this junction point is not connected to the amplifier input. The scanning rate control voltage from a pulse sampling demodulator (e.g. the demodulator 22 for waveform generator 25) is applied to the input resistor 133 and an off-centering control voltage from a shift control unit (e.g. the adjustable potentiometer 33) is applied to the resistor 131. Assuming firstly that the resistor 132 is connected as the feedback circuit across the amplifier 130, it can be seen that the shift control voltage is applied through the resistor 131 to the input of the amplifier. Provided the gain of the amplifier is very high, the voltage output from the amplifier in this circuit condition will be substantially a constant voltage proportional to the shift control voltage, the proportionality factor being the ratio of the magnitude of the resistor 132 to the magnitude of the resistor 131. If, on the other hand, the switch contact 136 is in the position so that the capacitor 134 is connected as the feedback circuit, it will be seen that the scanning rate control voltage is now applied through the resistor 133 to the input of the amplifier 130. With the capacitive feedback the amplifier will generate a sawtooth voltage which will start from the voltage datum to which the capacitor 134 has been previously charged, that is the previously mentioned constant voltage proportional to the shift control voltage. The amplifier 130 will thus generate a sawtooth voltage waveform starting from a value dependent on the previously applied shift control voltage and having a rate dependent on the applied scanning control voltage. In order to produce a corresponding current in a deflector coil (shown at 138 in FIGURE 6), the voltage output of the amplifier 130 is applied to a current generator comprising a valve 140 conveniently by applying the output voltage to the grid 141 of the valve and connecting the cathode 142 which is earthed through a cathode resistor 143, to the feedback circuit of the amplifier at the junction of the capacitor 134 and resistor 132. The cathode to grid circuit of the valve 140 is thus included in the feedback loop of the amplifier 130.

For providing the current through a second deflector coil (shown at 144 in FIGURE 6), a paraphase amplifier 145 comprises a high gain amplifier 146 having a resistive feedback circuit 147 and resistive input circuit 148. This amplifier operates, in a manner similar to the aforementioned amplifier 130 with its resistive input and feedback circuit 131, 132 to produce a voltage output proportional to the applied voltage input, which input, in the case of amplifier 146 is taken from the output of amplifier 130. To provide the necessary current output the voltage output of the amplifier 146 is applied to a current generating valve 149 which may be similar to the current generating valve 140 and has its cathode to grid circuit included in the feedback loop of amplifier 146.

The two deflection coils 138 and 144 in this arrangement are required to assist one another and thus the total current required by the two coils and hence the total current drain will remain substantially constant and will be independent of the amount of off-centering. Furthermore, it will be seen that the shift control required for the off-centering need merely be potentiometers for applying an adjustable shift voltage to the appropriate input circuits of the time base generators.

The aforementioned electronic switch 135 may conveniently be controlled by a bi-stable multivibrator 150 triggered from a trigger pulse generator (e.g. the pulse generator 27). Such a multivibrator is assumed to form part of gate pulse generators 28 and 39 for the waveform generators 25, 26, 40 and 41 of FIGURE 1. For waveform generators 55, 56 in FIGURE 1, however, this part has been shown for convenience as the gate circuit 75. This multivibrator may also be conveniently used to provide a brightening pulse for the cathode ray tube as indicated at 151 in FIGURE 6.

FIGURE 7 illustrates a bearing follow system which is generally similar to the arrangement of FIGURE 1 and in which similar reference numerals are used to indicate similar components. In the following description of FIGURE 7 no specific mention will be made of those components which are identical with those in FIGURE 1 and the description will only refer to the distinctive features.

For following in bearing only, it is not necessary to sample time base waveforms and it is sufficient if the video gate samples the outputs of the pulse sampling demodulators 22, 23 which, as previously described, provide direct voltages proportional to the sine and cosine of the angular position of the aerial. It will be appreciated that the sampling pulses for this purpose may be made of very much longer duration and hence the time constants of the circuit are much less critical. To effect this sampling, as shown in FIGURE 7 the outputs from the pulse sampling demodulators 22, 23 are fed as shown in FIGURE 7 by leads 160, 161 to the inputs of two pulse sampling demodulators 162, 163 which may be similar to the demodulator described with reference to FIGURE 2 or, if desired, may include the circuit shown in FIGURE 9 for causing the output to change at the rate of change measured over previous cycles of aerial scan. The video signals from the receiver 14 are amplified by the video amplifier 44 and fed to a video gate 164. The construction of the gate 164 may be similar to that described with reference to FIGURE 3. The video signals after passing through the gate 164 are fed to a video normaliser 165 to provide sampling pulses for sampling the signals on the leads 160, 161. The normaliser in FIGURE 7 may be similar to that described with reference to FIGURE 4 but, for the bearing follow arrangement of FIGURE 7, the duration of the pulses may be much greater than the pulses from the normaliser 46 of FIGURE 1 since the voltages to be sampled in the arrangement of FIGURE 7 change only at the aerial scanning frequency and not at the time base repetition frequency. The outputs from the pulse sampling demodulators 162, 163 are fed into a double coincidence comparator 166 which compares the output signals from the demodulator with the corresponding input signals and provides the control pulse for operating the gate 164. This double coincidence comparator 166 may be similar to that described with reference to FIGURE 5. In the arrangement of FIGURE 7, to guard against ground wave break through which would cause sampling on all bearings if it should be desired (as may be convenient) to use a relatively wide video gate 44 admitting signals over a wide value of different ranges, the double coincidence comparator 166 does not operate the video gate 164 directly but gates pulses from the trigger pulse generator 27 in a gating circuit 167. The first pulse to get through this gate operates a fixed delay 168, which might be a Miller integrator giving a delay of, for example 50 micro seconds and the delayed output is used to open the video gate 164 for the remainder of the pulse repetition period. It will be seen that the arrangement of FIGURE 7 is essentially a simplification of the arrangement of FIGURE 1 and provides, at output terminals 169, 170, signals proportional to the sine and cosine of the angular position of the aerial at the time of the selected response. As in the arrangement of FIGURE 1, the gate 164 may be opened for periods during each of a few successive line scans and then closed for the remainder of the aerial scanning period. The pulse sampling demodulators 162, 163 are arranged to hold the sampled signals for as long as necessary, that is for a period up to a complete cycle of the aerial revolution. As soon as the gate 164 is opened, the output signals from the demodulators are adjusted by the newly sampled voltages. The output voltages on terminals 169, 170 may be utilised for control purposes, for example to control the position in azimuth of the aerial of a height finding radar, or may be fed to an indicator for displaying the bearing of the selected response. For this latter purpose, there might be employed an indicator system generally similar to the arrangement of cathode ray tube 50 and associated circuits shown in FIGURE 1. By applying the output voltages on terminals 169, 170 to the scanning rate control inputs of waveform generators such as the waveform generators 55, 56, a trace would be produced on the display tube screen having an angular direction corresponding to the bearing of the selected response and this trace would follow any changes in bearing of the response.

With the arrangement of FIGURE 7, if bearings of a number of targets are to be indicated, separate pulse sampling demodulators 162, 163, gates 164, normalisers 165, double coincidence comparators 166, gates 167 and delays 168 would be required for each target. If it is required to display the bearings of all responses, however, the circuit arrangement of FIGURE 7 may be simplified and modified in the manner shown in FIGURE 8 so as to obviate any need for separate bearing follow circuits for each target.

In FIGURE 8 many of the components are similar to those in FIGURES 1 to 7, and similar reference numerals are used. No specific description will be given of those components and in the following, reference will be made only to the distinctive features of FIGURE 8. Referring to FIGURE 8, the video gate 164 and the double coincidence comparator 166 with its associated gating and delay circuits of FIGURE 7 are omitted and all the video signals are fed from the video amplifier 44 to the video normaliser 165. In FIGURE 8 there is illustrated another arrangement for preventing the transmitted pulses and the ground clutter from fixed targets in the immediate neighbourhood of the radar station from providing signals to the normaliser 165. For this purpose there is provided a video gate 172 which is arranged to cut out all video signals from short ranges, this video gate being controlled by a flip-flop circuit 173 triggered by the output of the trigger pulse generator 27. It will be seen that, with the arrangement of FIGURE 8, all the video signals except short range signals will produce the output sampling pulses from the video normaliser 165 and hence the pulse sampling demodulators 163, 164 will sample the sine and cosine signals on leads 160, 161 in succession at all the aerial bearings from which signals are received. The outputs from these pulse sampling demodulators 163, 164 will be held from the time of receipt of a response from one target until the signal is received from the next target, whereupon the outputs will immediately change to correspond to the bearing of the next target. The outputs from the pulse sampling demodulators 162, 163 may be used to control marker traces on a cathode ray tube. This may be done by providing two waveform generators such as have been described with reference to FIGURE 6 and feeding the outputs from the pulse sampling demodulators 162, 163 respectively to the two scanning rate control input circuits so as to produce currents through the deflector coils such as will cause the beam of a cathode ray tube to be deflected in a direction corresponding to the bearing angle sampled by the pulse sampling demodulators. This trace may be made repetitive at any desired rate provided this repetition rate is substantially faster than the rate at which the bearing control signals change from one target to the next and it will be seen that each trace will be produced repetitively on the screen of the tube at the bearing of a radar response until the radar receives the next response, whereupon the bearing display trace will hop to the bearing of this next response. If the bearing display tube has an afterglow, this system will provide a simple means of indicating which responses are moving in bearing.

It will be seen that the video gate 172 and flip-flop 173 might be used in the arrangement of FIGURE 7 for preventing ground clutter from causing sampling and, in that case, the output of the double coincidence comparator 166 may then be used directly to open the video gate 164. It will be noted that this method of eliminating ground clutter difficulties permits of sampling pulses being used extending over several cycles of the pulse repetition rate.

Although in describing the arrangements of FIGURES 7 and 8, reference has been made to the responses from targets, it will be appreciated that the arrangements of these two figures may be used for obtaining outputs representative of the bearings of any received signals, for example interfering signals from distant transmitters.

It will be apparent that the simplified technique of FIGURES 7 and 8 using a single store might be applied to a position follow system if it is required to have outputs representative of the positions of all targets, the outputs hopping from each one to the next in turn.

I claim:

1. A radar system comprising a pulse transmitter arranged to produce repetitive radio frequency pulses, a directional aerial system coupled to said transmitter for radiating pulses and for receiving echoes thereof, a receiver coupled to said aerial system to be fed with the received echoes to produce a video signal output, means for angularly moving the directional receiving beam of the aerial system in a repetitive manner, signal generator means synchronized with the receiving beam angular movement for producing two voltages having amplitudes proportional respectively to the sine and cosine of the angular position of the receiving beam, and pulse sampling storage means controlled by a sampling pulse derived from a received video signal corresponding to a selected response and arranged to sample the values of the voltages produced by said signal generator means at the instant of occurrence of the selected response and to provide output signals representative of those sampled values, which pulse sampling storage means comprises a video gating circuit for selecting one response in each successive cycle of the repetitive angular movement of the receiving beam, a sampling pulse generator coupled to said video gating circuit to produce a sampling pulse from the selected response in each successive cycle, and pulse sampling demodulating means controlled by said sampling pulse generator to sample the values of the voltages produced by said signal generator means at the instant of occurrence of each sampling pulse and to hold the sampled voltage values until the next successive sampling pulse is produced.

2. A radar system comprising a pulse transmitter arranged to produce repetitive radio frequency pulses, a directional aerial system coupled to said transmitter for radiating pulses and for receiving echoes thereof, a receiver coupled to said aerial system to be fed with the received echoes to produce a video signal output, means for angularly moving the directional receiving beam of the aerial system in a repetitive manner, signal generator means synchronized with the receiving beam angular movement for producing two voltages having amplitudes proportional respectively to the sine and cosine of the angular position of the receiving beam, and pulse sampling storage means controlled by a sampling pulse derived from a received video signal corresponding to a selected response and arranged to sample the values of the voltages produced by said signal generator means at the instant of occurrence of the selected response and to provide output signals representative of those sampled values, which pulse sampling storage means comprises a video gating circuit for gating the video signals in accordance with a gate control pulse to pass a selected response, pulse sampling demodulator means controlled by the gated video output of said video gating circuit to sample the values of the voltages produced by said signal generator means at the instant of occurrence of the selected response and to hold the sampled voltage values until the corresponding selected response occurs in the next successive cycle, a comparator to compare the input to said pulse sampling demodulator means with the last previously sampled outputs and to produce a short duration pulse when the inputs within predetermined limits are both equal to the corresponding previously sampled outputs, and means for applying said short duration pulse to said video gating circuit as said gate control pulse.

3. A radar system as claimed in claim 2 wherein said pulse sampling demodulator means comprise two separate pulse sampling demodulators for sampling respectively the two voltages produced by said signal generator means, both said pulse sampling demodulators being coupled to said video gating circuit to be controlled by the same gated video output.

4. A radar system as claimed in claim 2 wherein waveform shaping means are provided for normalizing the video output passed by said video gating circuit so that the control signal fed to said pulse sampling demodulator means is a pulse signal of predetermined duration and amplitude.

5. A radar system as claimed in claim 2 wherein there are provided means responsive to the differences between successive sampled values of the voltages produced by said signal generator means and arranged to produce smoothing voltages dependent on these differences which smoothing voltages vary gradually during the cycle to represent gradual changes of the difference magnitudes, and circuit means for combining the smoothing voltages with the outputs representative of the sampled values to reduce sudden changes in the voltage outputs at each sampling pulse.

6. A radar system comprising a pulse transmitter arranged to produce repetitive radio frequency pulses, a directional aerial system coupled to said transmitter for radiating pulses and for receiving echoes thereof, a receiver coupled to said aerial system to be fed with the received echoes to produce a video signal output, means for angularly moving the directional receiving beam of the aerial system in a repetitive manner, scanning signal generator means synchronized with the transmitter and with the receiving beam angular movement for producing two scanning sawtooth voltages synchronized to start with the transmitted pulses and having slopes proportional respectively to the sine and cosine of the angular position of the receiving beam, and pulse sampling storage means controlled by a sampling pulse derived from a received video signal corresponding to a selected response and arranged to sample the values of the scanning sawtooth voltages produced by said scanning signal generator means at the instant of occurrence of the selected response and to provide output signals representative of those sampled values, which pulse sampling storage means comprises a video gating circuit for selecting one response in each successive cycle of the repetitive angular movement of the receiving beam, a sampling pulse generator coupled to said video gating circuit to produce a sampling pulse from the selected response in each successive cycle, and pulse sampling demodulating means controlled by said sampling pulse generator to sample the values of said scanning sawtooth voltages at the instant of occurrence of each sampling pulse and to hold the sampled voltage values until the next successive sampling pulse is produced.

7. A radar system comprising a pulse transmitter arranged to produce repetitive radio frequency pulses, a directional aerial system coupled to said transmitter for radiating pulses and for receiving echoes thereof, a receiver coupled to said aerial system to be fed with the received echoes to produce a video signal output, means for angularly moving the directional receiving beam of the aerial system in a repetitive manner, scanning signal generator means synchronized with the transmitter and with the receiving beam angular movement for producing two scanning sawtooth voltages synchronized to start with the transmitted pulses and having slopes proportional respectively to the sine and cosine of the angular position of the receiving beam, and pulse sampling storage means controlled by a sampling pulse derived from a received video signal corresponding to a selected response and arranged to sample the values of the scanning sawtooth voltages produced by said scanning signal generator means at the instant of occurrence of the selected response and to provide output signals representative of those sampled values, which pulse sampling storage means comprises a video gating circuit for gating the video signals in accordance with a gate control pulse to pass a selected response, pulse sampling demodulator means controlled by the gated video output of said video gating circuit to sample the values of said scanning sawtooth voltages at the instant of occurrence of the selected response and to hold the sampled voltage values until the corresponding selected response occurs in the next successive cycle, a comparator to compare the inputs to said pulse sampling demodulator means with the last previously sampled outputs and to produce a short duration pulse when the inputs within predetermined limits are both equal to the corresponding previously sampled outputs, and means for applying said short duration pulse to said video gating circuits as said gate control pulse.

8. A radar system as claimed in claim 7 wherein said pulse sampling demodulator means comprise two separate pulse sampling demodulators for sampling respectively the two voltages produced by said signal generator means, both said pulse sampling demodulators being coupled to said video gating circuit to be controlled by the same gated video output.

9. A radar system as claimed in claim 7 wherein waveform shaping means are provided for normalizing the video output passed by said video gating circuit so that the control signal fed to said pulse sampling demodulator means is a pulse signal of predetermined duration and amplitude.

10. A radar system as claimed in claim 7 wherein there are provided means responsive to the differences between successive sampled values of said scanning sawtooth voltages arranged to produce smoothing voltages dependent on these differences and varying gradually during the cycle to represent gradual changes of difference magnitudes, and circuit means for combining the smoothing voltages with the outputs representative of the sampled values to reduce sudden changes in the voltage outputs at each sampling pulse.

11. In a system employing a cyclically repetitive electrical scanning signal and video pulse signals synchronized with the scanning signal, the combination of a video gating circuit for selecting one video pulse signal in each scanning cycle, a sampling pulse generator coupled to said video gating circuit to produce a sampling pulse from the selected video pulse signal in each successive cycle, and pulse sampling demodulating means controlled by said sampling pulse generator to sample the value of the scanning signal amplitude at the instant of occurrence of each sampling pulse and to hold the sampled value until the next successive sampling pulse is produced.

12. In a system employing a cyclically repetitive electrical scanning signal and video pulse signals synchronized with the scanning signal, the combination of a video gating circuit for gating the video pulse signal in accordance with a gate control pulse to pass a selected video pulse signal, a pulse sampling demodulator controlled by the gated video pulse output of said video gating circuit to sample the value of the scanning signal at the instant of occurrence of the selected video pulse signal and to hold the sampled value until the corresponding video pulse signal occurs in the next successive cycle, a comparator to compare the input to said pulse sampling demodulator with the last previously sampled output and to produce a short duration pulse when the input within predetermined limits is equal to the previously sampled output, and means for applying said short duration pulse to said video gating circuit as said gate control pulse.

13. In a system employing two synchronized electrical scanning signals and video pulse signals synchronized with the cycle of scanning signals, the combination of a video gating circuit for selecting one video pulse signal in each complete scanning cycle, a sampling pulse generator coupled to said video gating circuit to produce a sampling pulse from the selected video pulse signal in each successive cycle, and pulse sampling demodulating means controlled by said sampling pulse generator to sample the values of the scanning signal amplitudes at the instant of occurrence of each sampling pulse and to hold the sampled values until the next successive sampling pulse is produced.

14. In a system employing two synchronized electrical scanning signals and video pulse signals synchronized with the cycle of scanning signals, the combination of a video gating circuit for gating the video pulse signals in accordance with a gate control pulse to pass a selected video signal, pulse sampling demodulator means controlled by the gated video pulse output of said video gating circuit to sample the values of the two scanning signals at the instant of occurrence of the selected video pulse signal and to hold the sampled values until the corresponding selected video pulse signal occurs in the next successive complete scanning cycle, a comparator to compare the inputs to said pulse sampling demodulator means with the last previously sampled outputs and to produce a short duration pulse when the inputs within predetermined limits are both equal to the corresponding previously sampled outputs, and means for applying said short duration pulse to said video gating circuit as said gate control pulse.

15. In a system employing two synchronized electrical scanning signals and video pulse signals synchronized with the cycle of scanning signals, the combination of a video gating circuit for gating the video pulse signals in accordance with a gate control pulse to pass a selected video signal, two separate pulse sampling demodulators for sampling respectively the values of the two scanning signals at the instant of occurrence of the selected video pulse signal and to hold the sampled values until the next selected video pulse signal, both said pulse sampling demodulators being coupled to said video gating circuit to be controlled by the same gated video pulse signal output, a comparator to compare the inputs of said pulse sampling demodulator means with the last previously sampled outputs and to produce a short duration pulse when the inputs within predetermined limits are both equal to the corresponding previously sampled outputs, and means for applying said short duration pulse to said video gating circuit as said gate control pulse.

16. In apparatus employing a cyclic sequence of pulse signals in regularly repetitive cycles in which the time phase of at least one of the pulse signals varies gradually from cycle to cycle, means for producing an electrical output of a magnitude representative of the time phases of a selected one of said pulse signals comprising means for producing a voltage varying in time in synchronism with the repetitive sequence, a gating circuit for selecting a signal in each sequence, a sampling pulse generator coupled to said gating circuit to produce a sampling pulse from the selected signal in each successive sequence, and pulse sampling demodulating means controlled by said sampling pulse generator to sample the value of said voltage varying in time in synchronism with the repetitive sequence at the instant of occurrence of each sampling pulse and to hold the sampled value until the next successive sampling pulse is produced.

17. In a display system having a repetitively scanned cathode ray display tube employing orthogonal fixed deflector means fed with scanning signals for deflecting the cathode ray beam in two co-ordinate directions by the application of scanning signals and modulating means for modulating the beam with video pulse signals; the combination of a video gating circuit for selecting a video pulse signal in each complete scanning cycle, a sampling pulse generator coupled to said video gating circuit to produce a sampling pulse from the selected video pulse signal in each successive cycle, a waveform source providing signals having waveforms corresponding to the waveforms of the scanning signals, and pulse sampling demodulating means controlled by said sampling pulse generator to sample the magnitudes of the signals from said waveform source at the instant of occurrence of each sampling pulse and to hold the sampled values until the next successive sampling pulse is produced.

18. In a system employing a cyclically repetitive electrical scanning signal and video pulse signals synchronized with the scanning signal, the combination of a video gating circuit for selecting one video pulse signal in each scanning cycle, a sampling pulse generator coupled to said voltage gating circuit to produce a sampling pulse from the selected video pulse signal in each successive cycle, an amplifier having an input and an output and alternatively switchable first and second feedback and input circuits, said first feedback and input circuit including a resistor in an input path to the amplifier input and a capacitor forming a feedback across the amplifier between the output and the input with one terminal of the capacitor permanently connected to the amplifier output and said second feedback and input circuit including a resistor in an input path to the amplifier input and a resistor forming a resistive feedback path across the amplifier between the output and the input, switch means controlled by said sampling pulse generator to connect said first feedback and input circuit to said amplifier for the duration of each sampling pulse and to connect said second feedback and input circuit to said amplifier between the sampling pulses, means for applying the scanning signal to the resistor in the input path of said first feedback and input circuit, and means for applying an input control voltage to the resistor in the input path of said second feedback and input circuit.

19. The combination as claimed in claim 18 wherein said means for applying an input control voltage is arranged to apply a constant voltage to keep the charge on the capacitor constant between sampling pulses.

20. The combination as claimed in claim 18 wherein said means for applying an input control voltage comprises means responsive to the differences between the successive output voltages of the amplifier during the last successive sampling pulses to feed to the resistor in the input path of said second feedback and input circuit a smoothing voltage for reducing sudden changes in the voltage output of the amplifier at each sampling pulse.

References Cited in the file of this patent

UNITED STATES PATENTS

| 2,709,804 | Chance | May 31, 1955 |
| 2,849,708 | Matthews | Aug. 26, 1958 |
| 2,924,818 | White | Feb. 9, 1960 |
| 2,995,744 | Covely | Aug. 8, 1961 |